United States Patent [19]

Hagedorn et al.

[11] 4,286,792
[45] Sep. 1, 1981

[54] SELF-REPLENISHING SEAL FOR THE GAS OFFTAKE PIPING OF A COKE OVEN AND SEALING METHOD

[75] Inventors: Robert E. Hagedorn, North Huntington Township, Westmoreland County; Alphonse T. Lobue, Elizabeth Forward Township, Allegheny County, both of Pa.; Joseph G. Uhlman, Lone Star, Tex.

[73] Assignee: United States Steel Corporation, Pittsburgh, Pa.

[21] Appl. No.: 128,797

[22] Filed: Mar. 10, 1980

[51] Int. Cl.³ ............................................. F16J 15/40
[52] U.S. Cl. ..................................... 277/135; 202/254
[58] Field of Search ................ 277/135, 13, 14 V, 15; 202/254

[56] References Cited

U.S. PATENT DOCUMENTS

| | | | |
|---|---|---|---|
| 2,678,835 | 5/1954 | Clark | 277/135 |
| 2,954,244 | 9/1960 | Austin | 277/135 |
| 3,309,286 | 3/1967 | Alderman | 202/254 |

Primary Examiner—Robert I. Smith
Attorney, Agent, or Firm—William F. Riesmeyer

[57] ABSTRACT

A self-replenishing seal for the gas offtake piping of a coke oven and sealing method. The collector main with which the piping communicates has a trough containing a body of liquid. The end of the piping extends into the liquid to provide a seal which permits relative movement. The trough is located under a nozzle which supplies flushing liquor to the main. Flushing liquor from the nozzle automatically replenishes liquid lost from the trough.

2 Claims, 5 Drawing Figures

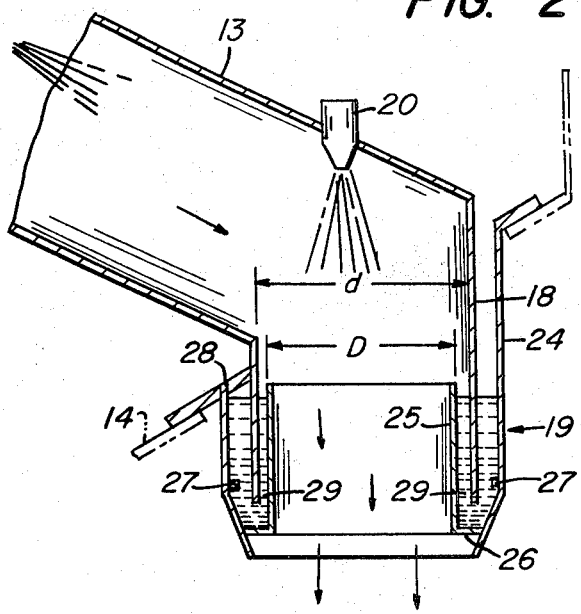
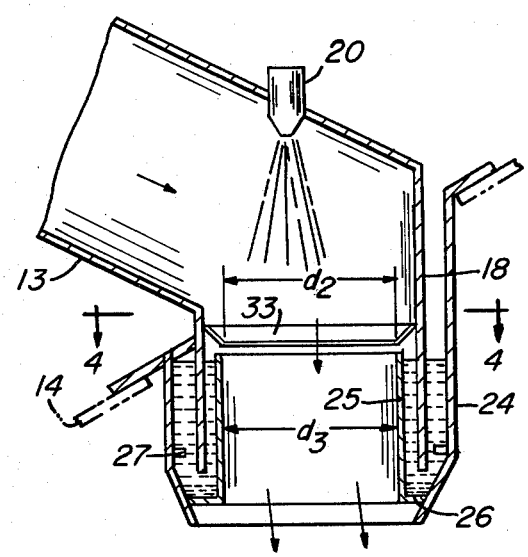
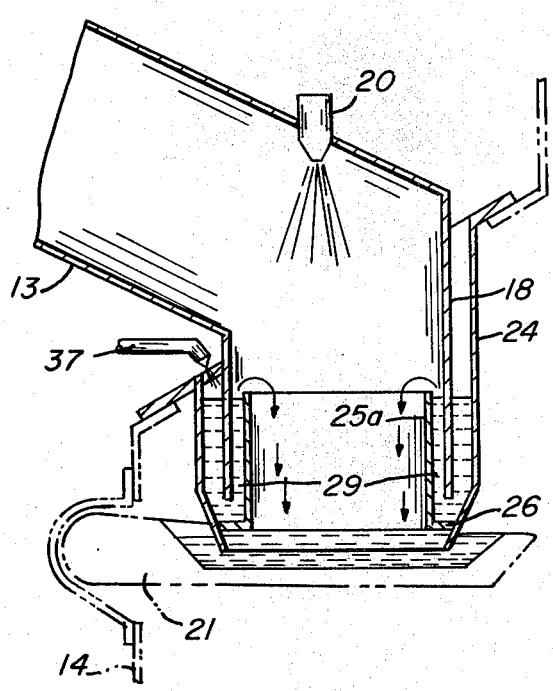
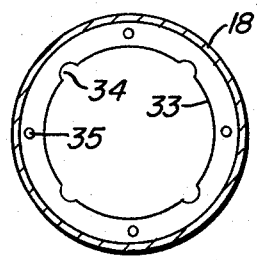

SELF-REPLENISHING SEAL FOR THE GAS OFFTAKE PIPING OF A COKE OVEN AND SEALING METHOD

This invention relates to an improved seal for the gas offtake piping of a coke oven and to an improved sealing method.

The gas offtake piping of a conventional coke oven includes an ascension pipe extending upwardly from the oven roof and a gooseneck communicating with the top of the ascension pipe and leading to a collector main which carries away gases given off from the oven. It is necessary to provide a seal, either between the ascension pipe and gooseneck or between the gooseneck and collector main, to permit relative movement of the parts, yet prevent escape of gases. The most common form of seal includes packing, such as asbestos rope with flyash cement, wrapped around the gooseneck and received in the adjacent part with which the gooseneck communicates. Seals formed of pitch, which is viscous at low temperatures but becomes liquid at the operating temperature, also are known. Reference can be made to Weber U.S. Pat. No. 2,343,034 or Tweit U.S. Pat. No. 2,424,865 for exemplary showings of seals located between an ascension pipe and gooseneck, and to Thompson U.S. Pat. No. 2,759,885 or Gidick U.S. Pat. No. 3,804,721 for seals located between a gooseneck and collector main.

Seals used heretofore have not been wholly satisfactory. Conventional costly packing materials fail by thermal cracking after relatively short usage. Also they interfere with relative movement of the parts, and require excessive maintenance. Pitch seals likewise are high maintenance items. Volatiles in pitch vaporize rapidly at relatively low operating temperatures, leaving a coke residue which solidifies in the joints and not only breaks the seal but also prevents relative movement.

An application of Champagne, Kelly and Nicely, Serial No. , filed coincidentally with the present application, shows and claims an improved seal which overcomes many of the problems encountered with seals previously used. The seal of the Champagne et al. application includes a trough fixed to one of the relatively movable parts of the offtake piping and receiving the other. The trough contains a body of a non-coking non-flammable liquid, such as silicone (preferred), water or a water-glycol solution. The seal requires a certain amount of maintenance in that the liquid must be replenished occasionally. The present invention is an improvement over the seal shown in the Champagne et al application in that the liquid of the seal is self-replenishing.

An object of our invention is to provide an improved liquid seal for the gas offtake piping of a coke oven and an improved sealing method in which the body of liquid forming the seal is self-replenishing, thereby further reducing the need for maintenance.

A more specific object is to provide a seal and sealing method in which the body of liquid forming the seal catches flushing liquor injected into the collector main, whereby liquid lost by evaporation or spillage is replenished automatically.

In the drawings:

FIG. 2 is a vertical sectional view of the seal on a larger scale;

FIG. 3 is a vertical sectional view similar to FIG. 2, but showing a modification;

FIG. 4 is a horizontal section on line IV—IV of FIG. 3; and

FIG. 5 is another vertical sectional view similar to FIGS. 2 and 3, but showing another modification.

Figure 1:
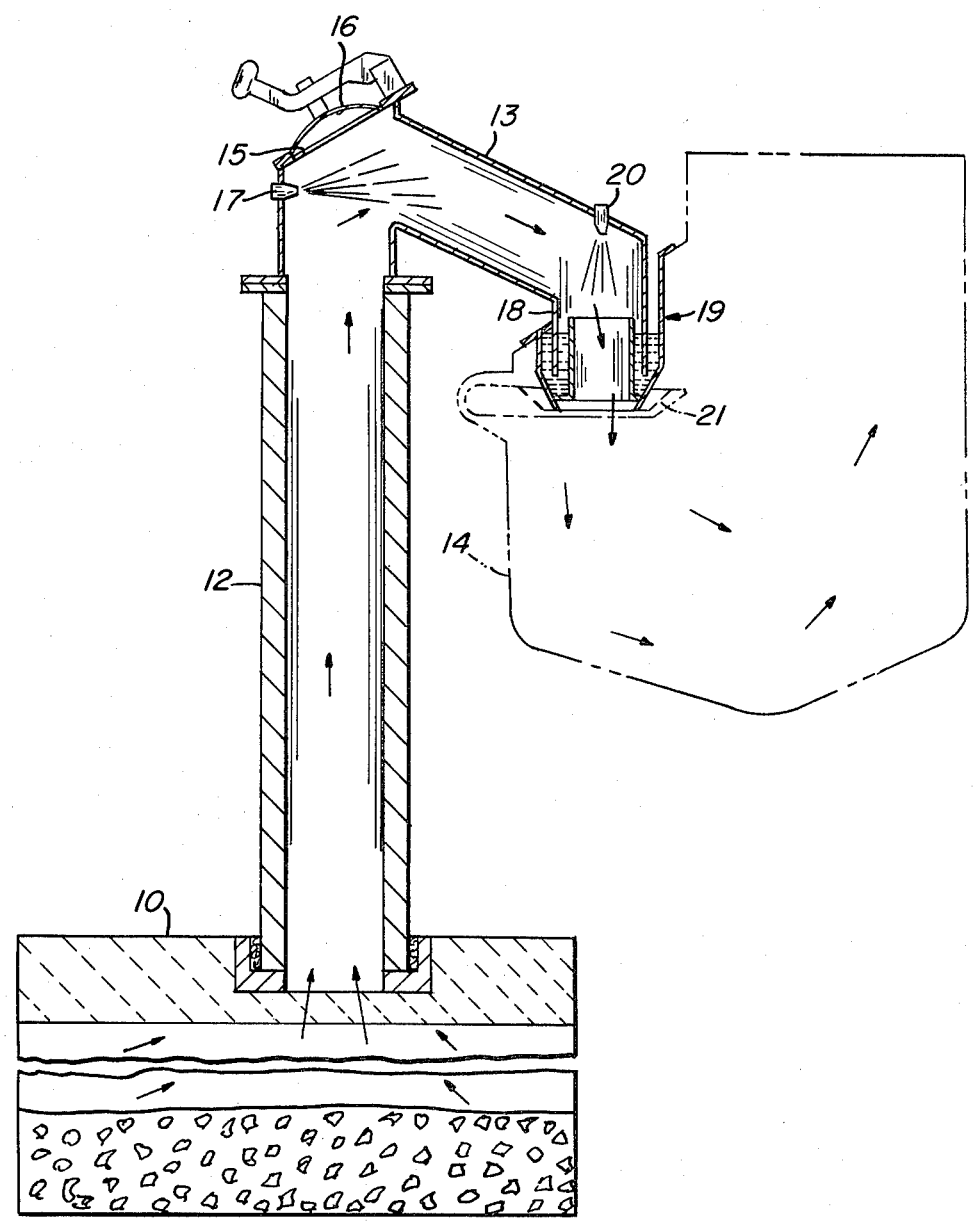
FIG. 1 is a vertical sectional view of a portion of a coke oven in which the gooseneck communicates with the collector main through a seal constructed in accordance with our invention.

FIG. 1 shows a portion of a coke oven which includes a roof 10, an ascension pipe 12 extending upwardly from the roof, and a gooseneck 13 communicating with the top of the ascension pipe and with a collector main 14. The gooseneck has the usual access opening 15, cover 16 for the opening, and nozzle 17 for admitting steam while coal is charged to the oven. At its discharge end the gooseneck has a vertical leg 18 which communicates with the main 14 through a seal 19 constructed in accordance with our invention and hereinafter described. A nozzle 20 for injecting flushing liquor is mounted in the top of the gooseneck axially aligned with the vertical leg 18. A damper dish 21 is pivoted within the main 14 below the seal 19. The coke oven and offtake piping may be conventional apart from the seal and hence are not described in detail.

As best shown in FIG. 2, the seal 19 includes an annular trough formed of spaced-apart concentric outer and inner walls 24 and 25 and a bottom wall 26. The vertical leg 18 of the gooseneck is received between the outer and inner walls with its lower edge spaced above the bottom wall. The inside face of the outer wall 24 carries circumferentially spaced blocks 27 which serve to maintain a space between the leg 18 and the outer wall despite relative movement. When our seal is applied to an old coke oven, the existing packing gland may serve as the outer wall of the trough. The upper edge of the outer wall 24 slopes at approximately the same angle as the wall of the collector main 14, while the upper edge of the inner wall 25 is approximately level. The upper edge of the outer wall has a low point 28 at approximately the same height as the upper edge of the inner wall. The inside diameter d of the leg 18 is approximately a half-inch larger than the outside diameter D of the inner wall 25. The distance between the lower edge of the leg 18 and the bottom wall 26 is approximately a quarter to a half-inch.

The trough formed by the walls 24, 25 and 26 retains a body 29 of liquid into which the lower end of the vertical leg 18 extends and forms a seal. Some liquid is inevitably lost through evaporation and spillage. While coal is charged to the oven, aspirating steam is injected for a short time through nozzle 17. This creates a high pressure within the leg 18 and may cause liquid to overflow the outer wall 24 of the trough. Flushing liquor is introduced continuously through the nozzle 20 to cool the coke oven gas and collects in the collector main 14. We locate the trough beneath the nozzle 20. By reason of this location, the trough catches a sufficient volume of flushing liquor to make up the losses, whereby the body 29 of liquid is self-replenishing.

FIGS. 3 and 4 show a modification in which an annular deflector plate or baffle 33 is fixed within the leg 18 overlying the space between the leg and the inner wall 25. The baffle slopes downwardly and inwardly at an angle which is about 20° to 60°. The inside diameter $d_2$ of the baffle is slightly less than the inside diameter $d_3$ of the inner wall 25. The baffle serves to prevent direct impingement of liquid or steam jets on the surface of the body 29 of liquid, such as may force liquid to overflow the outer wall 24. As shown in FIG. 4, the baffle has openings 34 and 35 through which flushing liquor can reach the trough in sufficient volume to replenish the supply.

FIG. 5 shows another modification in which the height of the inner wall 25a is below the low point 28 of the outer wall 24. A liquid feed line 37 is shown outside the outer wall 24 to supply liquid to the trough in the event the flushing liquor nozzles 20 become clogged or otherwise unserviceable. Besides maintaining a supply of liquid in the trough, liquid from line 37 may overflow the inner wall 25 and form a pool in the damper dish 21 when the latter is closed. The lower edge of the outer wall 24 lies within this pool to provide a seal which prevents atmospheric gases from entering the main 14. The baffle shown in FIGS. 3 and 4 may of course be used with the modification shown in FIG. 5.

From the foregoing description, it is seen that our invention affords a simple effective seal for the gas offtake of a coke oven and sealing method. The seal utilizes a body of liquid which normally is self-replenishing and requires almost no maintenance.

We claim:

1. In a combination which includes a coke oven, a collector main, gas offtake piping connecting said oven and said main, means in said piping for supplying flushing liquor to said main, and a seal between said piping and said main allowing relative movement, the improvement in which said seal comprises liquid retaining means on said main, said piping extending into said liquid retaining means, said liquid retaining means being located under said means for supplying flushing liquor to catch some of the flushing liquor for automatically replenishing liquid lost therefrom, and means overlying said liquid retaining means to prevent direct impingement of flushing liquor and steam jets on liquid already within said liquid-retaining means, but admitting flushing liquor thereto.

2. A combination as defined in claim 1 in which said liquid-retaining means includes an annular trough fixed within said main, said piping includes a vertical leg extending into said trough, said means for supplying flushing liquor includes a nozzle above said vertical leg axially aligned therewith, and the combination comprises in addition an annular baffle fixed within said vertical leg and overlying said trough to prevent direct impingement of flushing liquor on liquid already within said trough, said baffle having openings for admitting flushing liquor to said trough.

* * * * *